(12) United States Patent
Almy (10) Patent No.: US 9,923,509 B2
(45) Date of Patent: Mar. 20, 2018

(54) SPRING LOADED MOUNTING FOOT FOR PHOTOVOLTAIC SYSTEMS

(71) Applicant: SolarCity Corporation, San Mateo, CA (US)

(72) Inventor: Charles Almy, Berkeley, CA (US)

(73) Assignee: SolarCity Corporation, San Mateo, CA (US)

(*) Notice: Subject to any disclaimer, the term of this patent is extended or adjusted under 35 U.S.C. 154(b) by 0 days.

(21) Appl. No.: 14/806,544

(22) Filed: Jul. 22, 2015

(65) Prior Publication Data

US 2017/0025986 A1    Jan. 26, 2017

(51) Int. Cl.
*F16B 2/02*    (2006.01)
*F16M 13/02*   (2006.01)
*F16M 11/08*   (2006.01)
*H02S 20/23*   (2014.01)
*F24J 2/52*    (2006.01)

(52) U.S. Cl.
CPC ............. *H02S 20/23* (2014.12); *F16B 2/02* (2013.01); *F16M 13/022* (2013.01); *F24J 2/5254* (2013.01); *F24J 2/5256* (2013.01); *F16M 11/08* (2013.01)

(58) Field of Classification Search
CPC .......... H02S 20/23; H02S 20/24; H02S 20/26; H02S 30/10; F16B 2/02; F16M 13/022; F16M 11/08
USPC .... 248/619, 629, 237, 316.1, 534; 52/173.1, 52/173.3, 202, 745.21; 136/244, 251; 126/623, 704
See application file for complete search history.

(56) References Cited

U.S. PATENT DOCUMENTS

| | | | | |
|---|---|---|---|---|
| 3,606,704 | A * | 9/1971 | Denton | ............ E04F 15/024 248/619 |
| 7,478,790 | B2 * | 1/2009 | Yun | ............ F04B 39/0044 248/622 |
| 7,823,583 | B2 | 11/2010 | Allen et al. | |
| 7,905,227 | B2 | 3/2011 | Luconi et al. | |
| 8,756,881 | B2 * | 6/2014 | West | ............ E04B 1/38 248/148 |
| 2014/0230877 | A1 | 8/2014 | Goldberg et al. | |
| 2015/0155823 | A1 | 6/2015 | West et al. | |
| 2016/0142006 | A1 * | 5/2016 | Meine | ............ H02S 20/23 174/535 |
| 2016/0226435 | A1 * | 8/2016 | Almy | ............ H02S 20/23 |
| 2016/0248367 | A1 * | 8/2016 | Almy | ............ H02S 30/10 |
| 2016/0248368 | A1 * | 8/2016 | Seery | ............ H02S 20/23 |

FOREIGN PATENT DOCUMENTS

| | | |
|---|---|---|
| DE | 3909584 A1 | 9/1990 |
| DE | 202004015314 U1 | 3/2005 |
| DE | 202009000030 U1 | 4/2009 |
| DE | 202009003667 U1 | 7/2009 |
| DE | 102009018362 A1 | 11/2010 |
| EP | 2520877 B1 | 11/2014 |

* cited by examiner

*Primary Examiner* — Tan Le
(74) *Attorney, Agent, or Firm* — Kilpatrick Townsend & Stockton LLP (57) ABSTRACT

A photovoltaic (PV) module mounting system including a mounting puck, an arm portion, and a PV module coupling device for coupling to the frames of two photovoltaic modules attached to the arm portion. A clamp pin formed in the mounting puck restrains the arm portion against the mounting puck when a spring holding the clamp pin is released from a compressed position.

20 Claims, 6 Drawing Sheets

SPRING LOADED MOUNTING FOOT FOR PHOTOVOLTAIC SYSTEMS

BACKGROUND OF THE INVENTION

There are many systems available for mounting photovoltaic (PV) modules to building structures, such as a roof. These systems serve as a rigid interconnetion element between a roof and a PV module to hold the modules in place and resist the forces of gravity and wind.

Traditionally, mounting systems consisted of rows of rail structures attached to the roof in columns or rows. Module clamps were used to attach the PV modules to these rail structures. Although effective, these traditional systems required complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames as part of the PV mounting system, system part counts and costs of PV mounting systems were significantly reduced while installation time and overall aesthetics were improved. This realization caused the majority of the residential solar industry to move away from rail-based solutions. However, in order to continue the momentum of solar against other fossil fuel-based energy sources, it is imperative that both hard and soft PV costs continue to be reduced.

Most rail-free or so-called direct mount systems, rely on pillar-like PV module supports which connect to each module frame at various points around the array—typically at least four points on each module. These module supports are in turn attached to the roof, either into a roof rafter or directly to the roof deck, via a flashing. The flashing is just a flat sheet of aluminum with a preformed feature designed to mate with the module support and typically including at least one lag-bolt through-hole for securing both the flashing and the module support to the roof.

Although effective at reducing water leaks and covering missed drill holes, flashings can increase the time of installation because when they are used, the installer must complete all site preparation first before placing any of the PV modules, installing a flashing at each intended roof penetration. This bottleneck prevents an installer from installing the array row-by-row or panel-by-panel and, as a result, may slow-down the rate at which PV can be installed, may require larger installation crews, or both. Also, because each flashing gets tucked underneath the next up-roof course of shingles, it is often necessary to remove existing roofing nails to accommodate the flashings. Each time an existing roofing nail is removed, a new potential leak point is created. Finally, each flashing adds a material cost to each solar installation that becomes significant when multiplied against every roof penetration of every installed array.

Accordingly, there is a need for a rail-free PV mounting system that enjoys the benefits of existing rail-free solutions, while reducing costs, and increasing installation times relative to such systems.

BRIEF SUMMARY OF THE INVENTION

Many embodiments of the invention are related to a photovoltaic (PV) module mounting system that can include a mounting puck, an arm portion, and a PV module coupling device for coupling together the frames of at least two photovoltaic modules. A clamp pin can be formed in the mounting puck and adapted to restrain the arm portion against the mounting puck when a spring holding the clamp pin is released from a compressed position.

In many embodiments, the mounting puck can have an upper surface elevated above a lower edge, and a passage breaking the upper surface for accommodating a lag bolt.

In many embodiments, the arm portion can extend in cantilever from the upper surface of the mounting puck.

In many embodiments, the arm portion can include an elongated beam having a rectangular cross-section.

In many embodiments, the clamp pin includes a recess adapted to hold the rectangular cross-section.

In many embodiments, the spring holding the clamp pin can be restrained in the compressed position by a release pin.

In many embodiments, the clamp pin can extend externally through a portion of the mounting puck.

In many embodiments, the spring can hold the clamp pin at an internal portion of the mounting puck.

In many embodiments, the PV module coupling device can be a rock-it connector.

In many embodiments, the PV module coupling device can be a clamping connector.

Many embodiments of the invention are related to photovoltaic (PV) module mounting system having a mounting puck adapted to mount to a structure via a lag bolt. The mounting puck can have a mounting puck upper surface. A clamp pin can extend through the mounting puck upper surface and be adapted to move from a first position to a second position. A spring can bias the clamp pin against the mounting puck to the second position. The system can also include an arm portion having a PV module coupling device mounting platform. The arm portion can extend in cantilever from the mounting puck and be held by the clamp pin against the mounting puck upper surface when the clamp pin is in the second position.

In many embodiments, the arm portion can be free to move when the clamp pin is in the second position.

In many embodiments, a release pin can maintain the clamp pin in the first position and release the pin to the second position when the release pin is removed.

In many embodiments, the clamp pin can include a release portion for allowing the clamp pin to be pried from the second position to the first position.

In many embodiments, the clamp pin can be rotatable with respect to the mounting puck to allow the PV module coupling device mounting platform to be placed 360 degrees about the clamp pin.

Many embodiments of the invention are related to photovoltaic (PV) module mounting system having a mounting puck adapted to mount to a structure. The mounting puck can include a mounting puck exterior surface and a mounting puck interior surface. A clamp pin can extend upwardly through the mounting puck exterior surface from the mounting puck interior surface and be spring biased towards the mounting puck interior surface. The system can include an arm portion having a PV module coupling device mounting platform. The arm portion can extend in cantilever from the mounting puck and be releasably coupled to the clamp pin.

In many embodiments, the mounting puck comprises a shelled structure.

In many embodiments, the clamp pin can be selectively releasable from a position in which the arm portion is free to a position in which the clamp pin holds the arm portion against the mounting puck exterior surface.

In many embodiments, the clamp pin can be selectively releasable by movement of a release pin that extends from the mounting puck exterior surface and couples against the clamp pin.

In many embodiments, a spring can encircle the clamp pin.

DETAILED DESCRIPTION OF THE INVENTION

Embodiments of the invention are generally directed towards a system for mounting a PV module to a support structure such as a roof surface. The system can include a mounting puck and an arm portion for supporting a PV module. The system provides a boltless system for rigidly fixing the clamp assembly to the base portion assembly in a sufficient manner to permanently support the weight of one or more PV modules. Advantageously, such a system requires little to no tools for installation, and hence installation time is greatly reduced over prior systems that require additional tools and bolting. The following description details some examples of such a system.

Figure 1A:
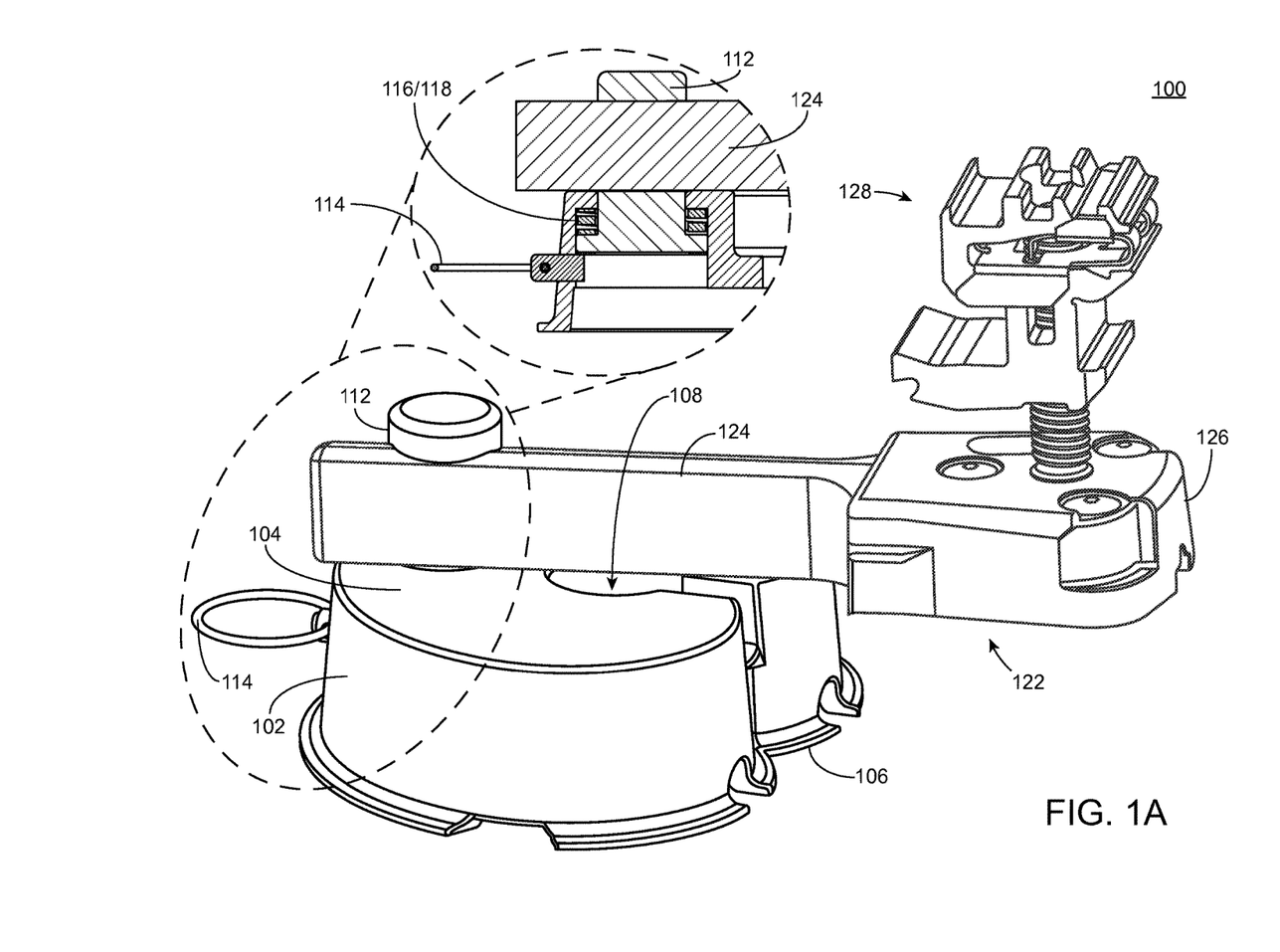
FIGS. 1A and 1B respectively show perspective and exploded views of an exemplary PV module mounting system, according to an embodiment of the invention.
Figure 1B:
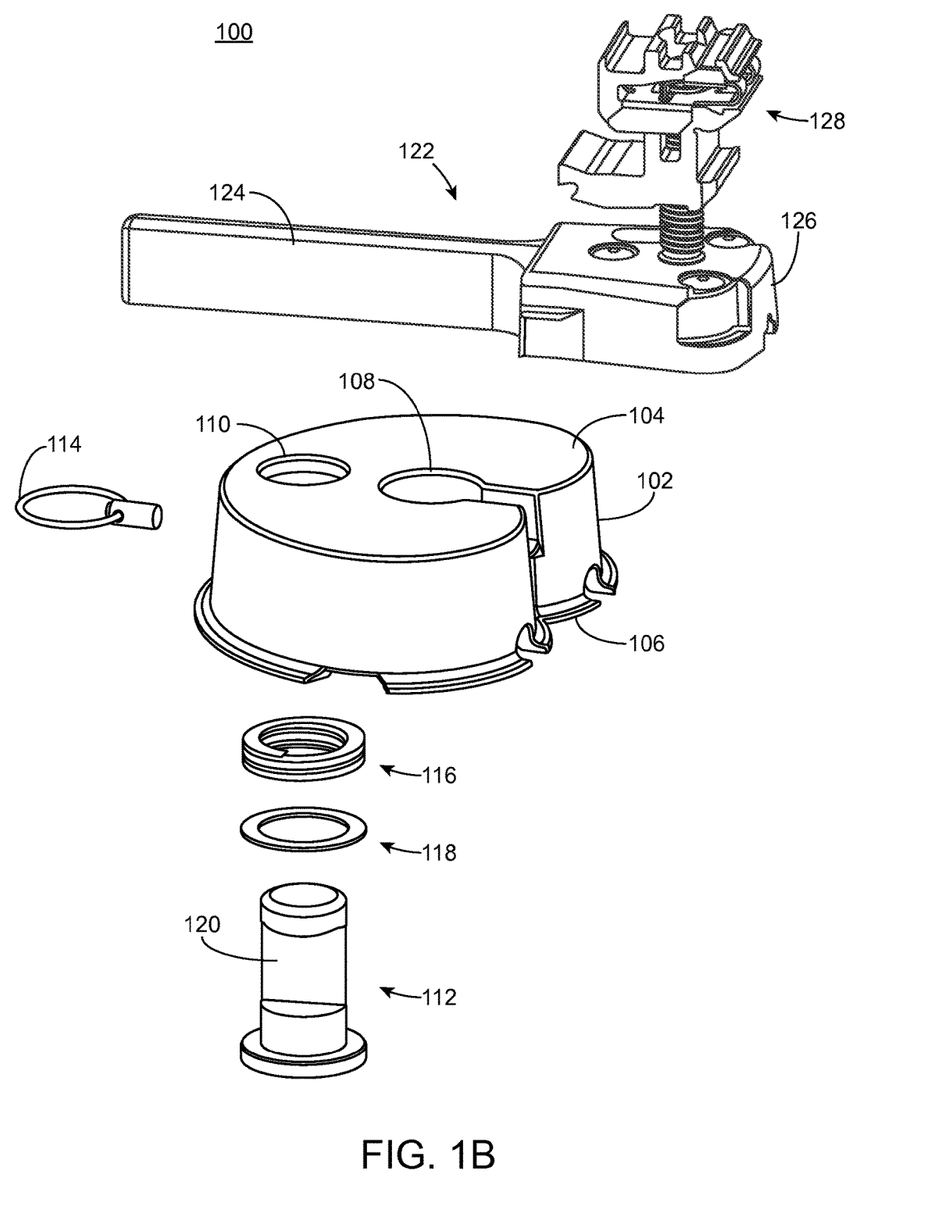
Figure 1C:
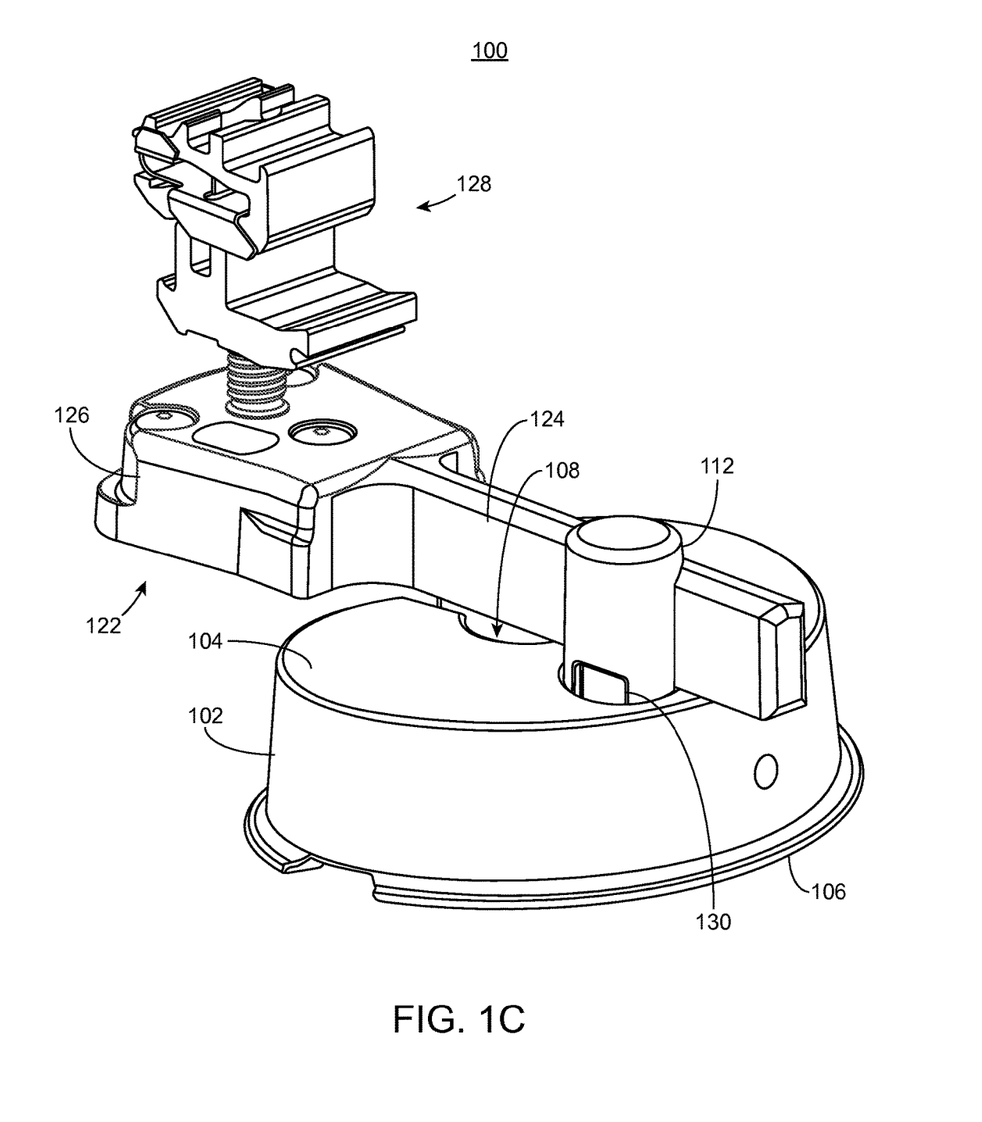
FIG. 1C shows a perspective view of an exemplary PV module mounting system, according to an embodiment of the invention.

FIGS. 1A and 1B respectively show perspective and exploded views of PV module mounting system 100, while FIG. 1C shows a perspective view of the same. System 100 includes mounting puck 102, which in this example configured as a shelled structure having exterior and interior surfaces. In some embodiments, mounting puck 102 is integrated with a roof flashing. In other embodiments, mounting puck 102 will sit on roof flashing. Such a flashing may have one or more raised guides to control the location of puck 102 on the flashing. Similar mounting pucks and variations including such flashings useable herein are shown at commonly assigned U.S. Pat. No. 8,756,881, which is incorporated by reference in its entirety. Mounting puck 102 generally includes upper surface 104 that is elevated above lower most edge 106. Upper surface 104 includes a one or more bolt passages, such as bolt passage 108, breaking upper surface 104, for accommodating a lag bolt, or other type of mechanical attachment, to enable mounting puck 102 to be mounted to a structure, such as a roof. Puck 102 may be comprised of cast steel, galvanized steel, aluminum, or other suitable outdoor rated material. Lower most edge 106 may circumscribe nearly all of the bottom edge of mounting puck 102, however, there may be one or more openings formed in lower most edge, such as opening 108, to enable any water that enters puck 102 to exit under the force of gravity.

Upper surface 104 also includes pin passage 110 for accommodating spring biased clamp pin 112. Clamp pin 112 extends past upper surface 104 from an interior passage of mounting puck 102, and is held in an upward position by release pin 114. Spring 116 and supporting washer 118 encircle clamp pin 112. In a first position, spring 116 is compressed to bias clamp pin 112 downwardly into the interior of mounting puck 102 so that arm portion 122 may be selectively positioned along upper surface 104 of puck 102.

Clamp pin 112 includes relief portion 120 for engaging arm portion 122 and holding it against upper surface 104. Arm portion 122 includes elongated beam 124. In various embodiments, elongated beam 124 may have a rectangular cross-section for complimentary fitting within relief portion 120 of pin 112. In various embodiments, the upper surface of arm beam 124 may be curved upward and the top portion of relief portion 120 may including a matching reciprocal curve. Such a configuration may enable beam 124 to move within relief portion without become disconnected from relief portion 112 prior to removal of pin 114.

Figure 4:
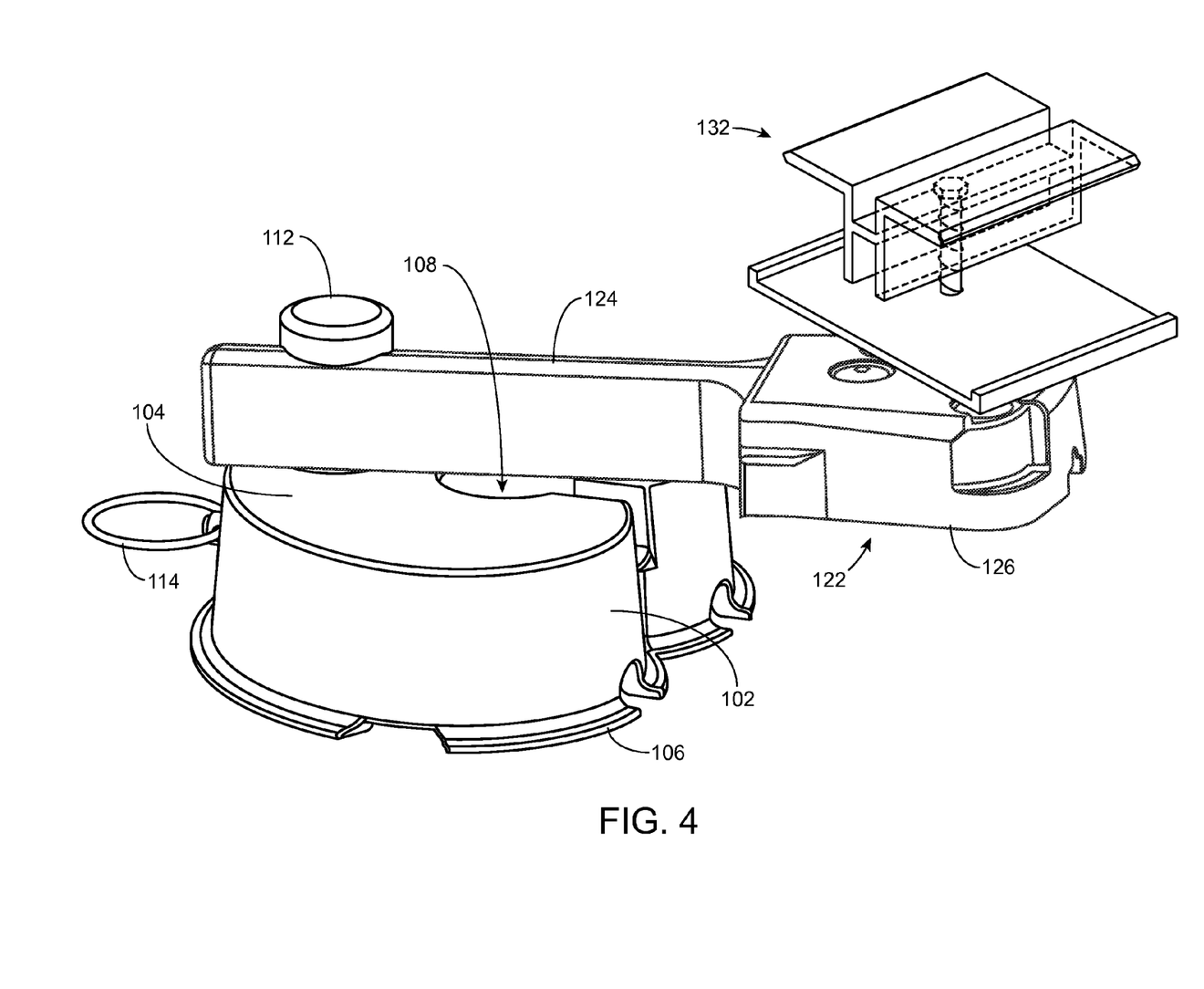
FIG. 4 shows a perspective view of an exemplary PV mounting system, according to an embodiment of the invention.

Elongated beam 124 leads to PV module mounting platform 126 that supports PV module coupling device 128 configured to couple together the frames of at least two photovoltaic modules. PV module coupling device 128 in FIGS. 1A and 1B is a "rock-it" style connector manufactured by SolarCity Corp., which is arranged to connect to respective frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, system 100 is not limited to use of such a coupling device. A multitude of different styles of coupling devices are compatible with the system, for example, such as the coupling device 132 illustrated at FIG. 4, which depicts a clamping-style coupling device 132 with an upper and lower clamp arranged to clamp the top and bottom portions of a PV module.

Continuing with reference to FIGS. 1A-C, elongated beam 124 is also supported by flat upper surface 104 of mounting puck 102. Flat upper surface 104 allows for 360 degrees of placement of arm portion 122 with respect to clamp pin 112. As shown at FIG. 1C, in some embodiments, clamp pin 112 includes release portion 130 for allowing clamp pin 112 to be pried upwardly using a prying tool to release arm portion 122, thereby enabling an installer to disengage arm portion 122 from puck 102 for module repair, replacement, repositioning or removal.

Figure 2:
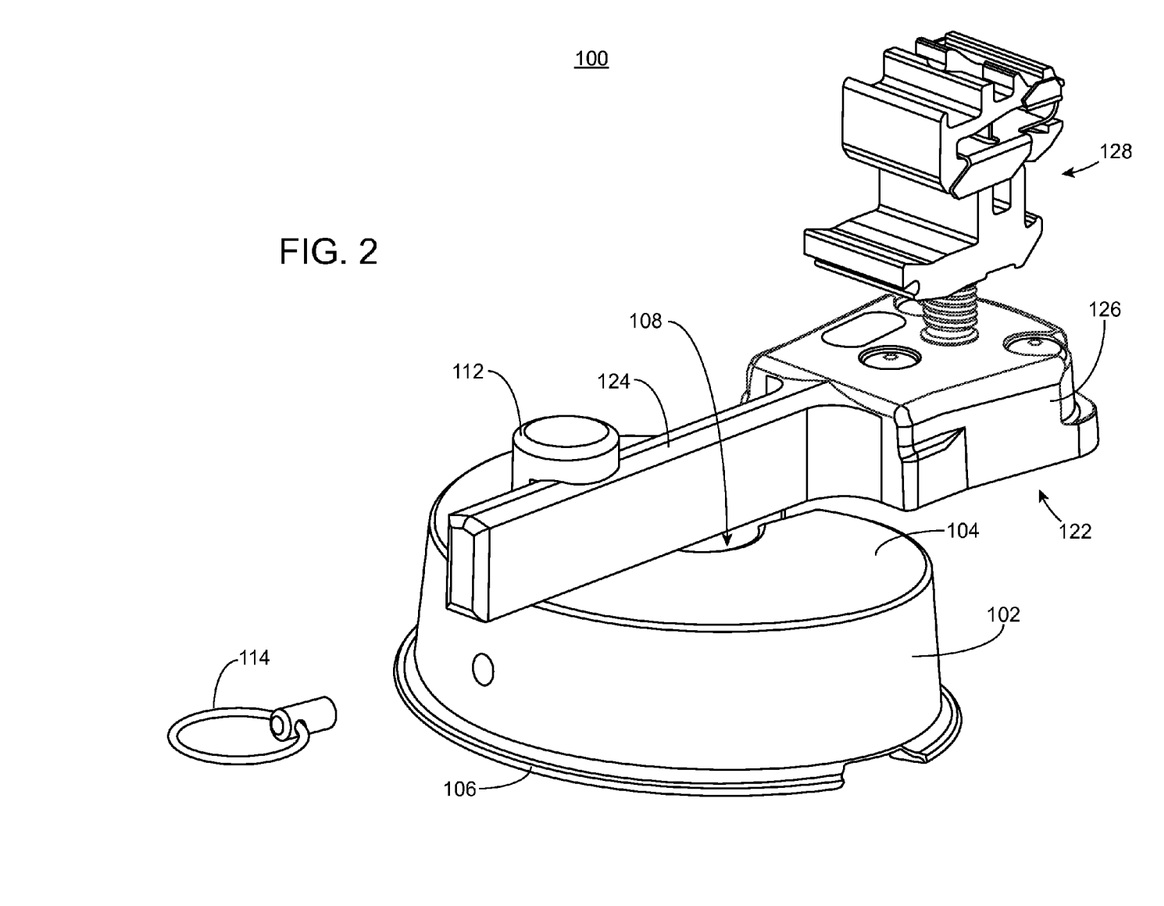
FIG. 2 shows a perspective view of a PV module mounting system in use, according to an embodiment of the invention.

In use, mounting puck 102 is first attached to a structure, such as a roof, by securing a lag bolt though the bolt passage 108 to the structure. At this time, arm portion 122 may not yet be attached to mounting puck 102 and clamp pin 112 is maintained in an upward position as shown at the partial cross-sectional view of FIG. 1A. Alternatively, arm portion 122 may be loosely attached to mounting puck 102 so that arm portion 122 may move longitudinally under relief portion 120. Arm portion 122 can then be brought into position against relief portion 120 of clamp pin 112, either by insertion at the distal end of arm portion 122 under relief portion 120, or by rotating arm portion and pivoting it under relief portion 120. After the desired location of arm portion 122 with respect to mounting puck 102 is achieved, release pin 114 can be pulled to selectively release clamp pin 112, as shown at FIG. 2. This causes spring 116 to expand and bias clamp pin 112 downwardly against elongated beam 124 of arm portion 122, thereby holding arm portion 122 securely against mounting puck 102. If placement is incorrect or if system 100 requires adjustment, an installer can pry clamp pin 122 upwardly at the second relief portion 130 by using a tool (e.g. flat bladed screwdriver), and reinstall release pin 114 to selectively release arm portion 122.

Figure 3:
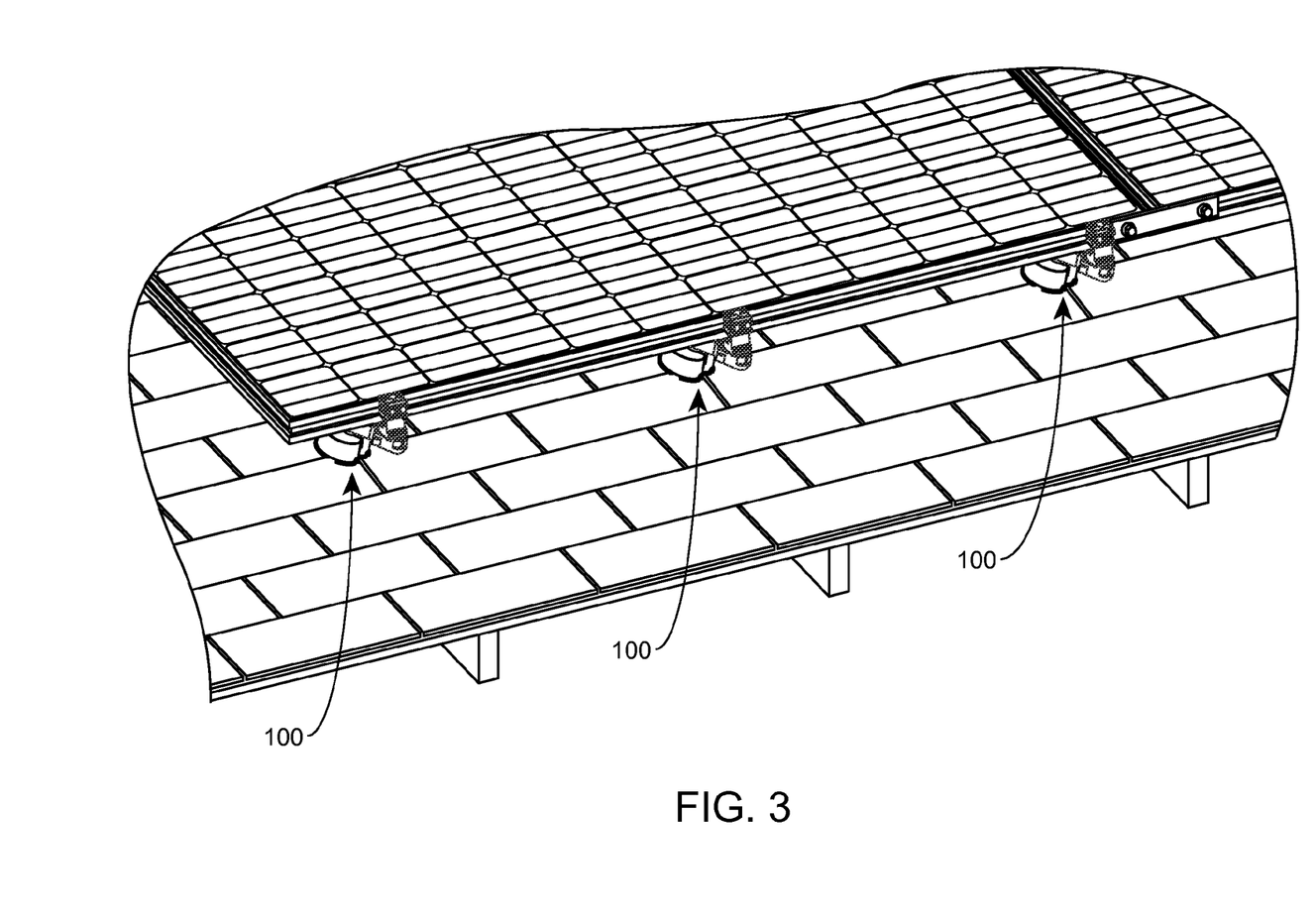
FIG. 3 shows a plurality of PV module mounting systems in use, according to an embodiment of the invention.

FIG. 3 shows a plurality of systems 100 mounted to a composite shingle roof and supporting an array of PV modules. While the system 100 is shown mounted to a sloped roof, the system 100 can be used on a variety of structures. Moreover, although the roof shown in FIG. 3 is a composition shingle roof, the mounting system 100 according to the various embodiments may be used with a flat tile, curved tile, shake, or other type of roof. Furthermore, although in the exemplary system of FIG. 3 there are three systems on one side of a PV module, it should be appreciated that in various embodiments, fewer or more systems may be used on a given side of a PV module frame, including no systems on some sides. Also, although puck portions 102 are shown oriented over a roof rafter, in various embodiments, puck portion may be located elsewhere on the roof.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic (PV) module mounting system comprising:
   a mounting puck;
   an arm portion;
   a spring within the mounting puck;
   a PV module coupling device, connected to the arm portion, configured for coupling together frames of at least two photovoltaic modules; and
   a clamp pin comprising a first portion extending away from the mounting puck, wherein the spring biasis the first portion of the clamp pin toward the mounting puck in order for the first portion to restrain the arm portion against the mounting puck.

2. The system of claim 1, wherein the mounting puck comprises an upper surface elevated above a lower edge, and a passage formed in the upper surface for accommodating a lag bolt.

3. The system of claim 2, wherein the arm portion extends in cantilever from the upper surface of the mounting puck.

4. The system of claim 1, wherein the arm portion comprises an elongated beam having a rectangular cross-section.

5. The system of claim 4, wherein the clamp pin comprises a recess with a rectangular cross-section configured to recieve the rectangular cross-section of the elongated beam and hold the arm portion against the upper surface of the mounting puck.

6. The system of claim 1, further comprising a release pin, wherein the clamp pin is configured to be restrained by the release pin preventing the first portion of the cliam pin from translating toward the mounting puck.

7. The system of claim 2, wherein the clamp pin extends externally through the upper surface of the mounting puck.

8. The system of claim 7, wherein the spring holds the clamp pin at an internal portion of the mounting puck.

9. The system of claim 1, wherein the PV module coupling device comprise rock-it connector.

10. The system of claim 1, wherein the PV module coupling device comprises a clamping-style connector.

11. A photovoltaic (PV) module mounting system comprising:
    a mounting puck adapted to mount to a structure via a lag bolt, the mounting puck having a mounting puck upper surface and one or more side surfaces;
    a clamp pin extending through the mounting puck upper surface and being adapted to move from a first position to a second position;
    a spring biasing the clamp pin from the first portion towards the second position; and
    an arm portion comprising a PV module coupling device mounting platform, the arm portion extending in cantilever from the mounting puck, wherein the arm portion contacts the clamp pin and is not held by the clamp pin against the mounting puck upper surface when the clamp pin is in the first position, and wherein the spring and the clamp pin are configured to hold the arm portion against the mounting puck upper surface when the clamp pin is in the second position.

12. The system of claim 11, wherein the arm portion and clamp pin are free to rotate relative to the mounting puck when the clamp pin is in the first position.

13. The system of claim 11, further comprising a release pin configured to be positioned in a passage in the mounting puck in an engaged position, wherein when the clamp pin is the first position and the release pin is in the engaged position the release pin contacts the clamp pin and prevents the clamp pin from moving from the first position to the second position, wherein when the clamp pin is in the first position and the release pin is not in the engaged position the release pin does not contact the clamp pin and the clamp pin is configured to move from the first position to the second position due to the spring.

14. The system of claim 11, wherein the clamp pin comprises a release indentation, wherein the release indentation is configured to allow the clamp pin to be pried from the second position to the first position.

15. The system of claim 11, wherein in the first position the clamp pin is rotatable with respect to the mounting puck to allow the PV module coupling device mounting platform to be placed 360 degrees about the clamp pin.

16. A photovoltaic (PV) module mounting system comprising:
 a mounting puck adapted to mount to a structure, the mounting puck having an exterior surface and an interior surface, wherein the interior surface defines an interior space;
 a clamp pin comprising a first end and a second end, opposite the first end, wherein the second end is positioned within the interior space, and wherein the clamp pin extends from the second end through the exterior surface to the first end;
 a spring positioned within the interior space and contacting the interior surface and the clamp pin causing the spring to exert force on the clamp pin biasing the second end of the clamp pin to be away from the interior surface; and
 an arm portion comprising a PV module coupling device mounting platform, the arm portion extending in cantilever from the mounting puck and releasably coupled to the clamp pin.

17. The system of claim 16, wherein the mounting puck comprises a shelled structure.

18. The system of claim 16, wherein the clamp pin is selectively releasable from a position in which the arm portion is free to a position in which the clamp pin holds the arm portion against the mounting puck exterior surface.

19. The system of claim 16, further comprising a release pin, wherein the clamp pin is selectively releasable by a release pin that extends from a portion of the mounting puck exterior surface and couples against the clamp pin.

20. The system of claim 16, wherein the spring encircles the clamp pin.

* * * * *